Feb. 28, 1956  W. LINES  2,736,368
METHOD AND APPARATUS FOR THE ASSEMBLY OF WIRE-SPOKE WHEELS
Filed Dec. 5, 1949  8 Sheets-Sheet 1
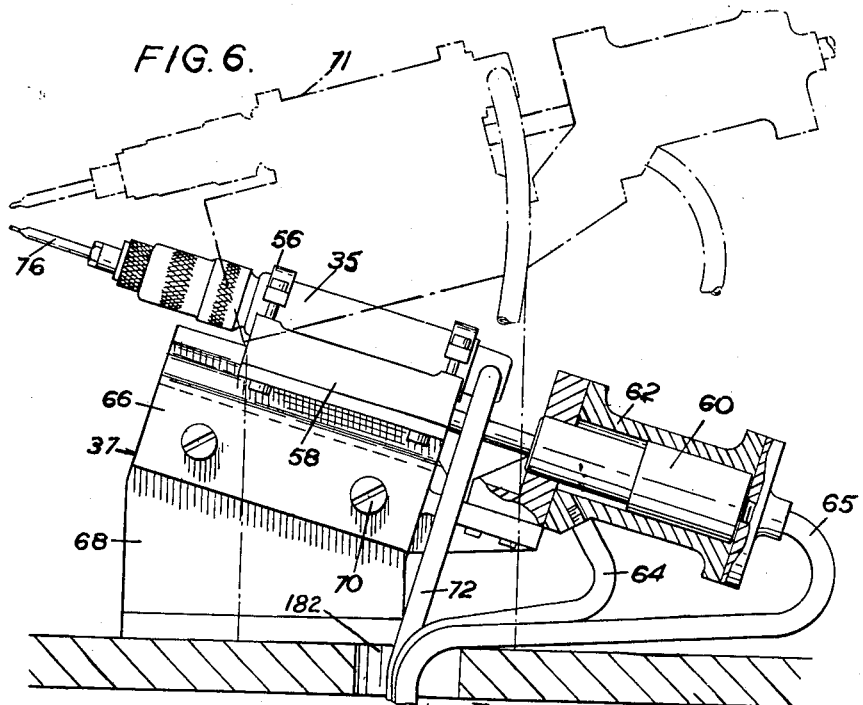
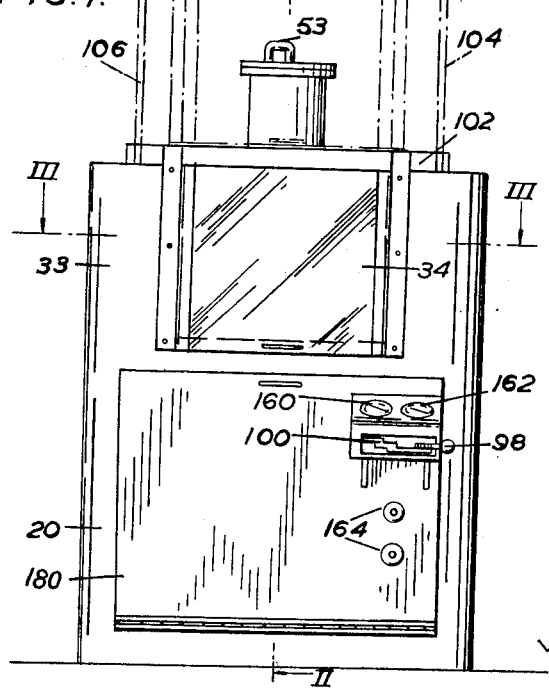
Inventor
WALTER LINES
By
Roberts B Lawson  Attorney

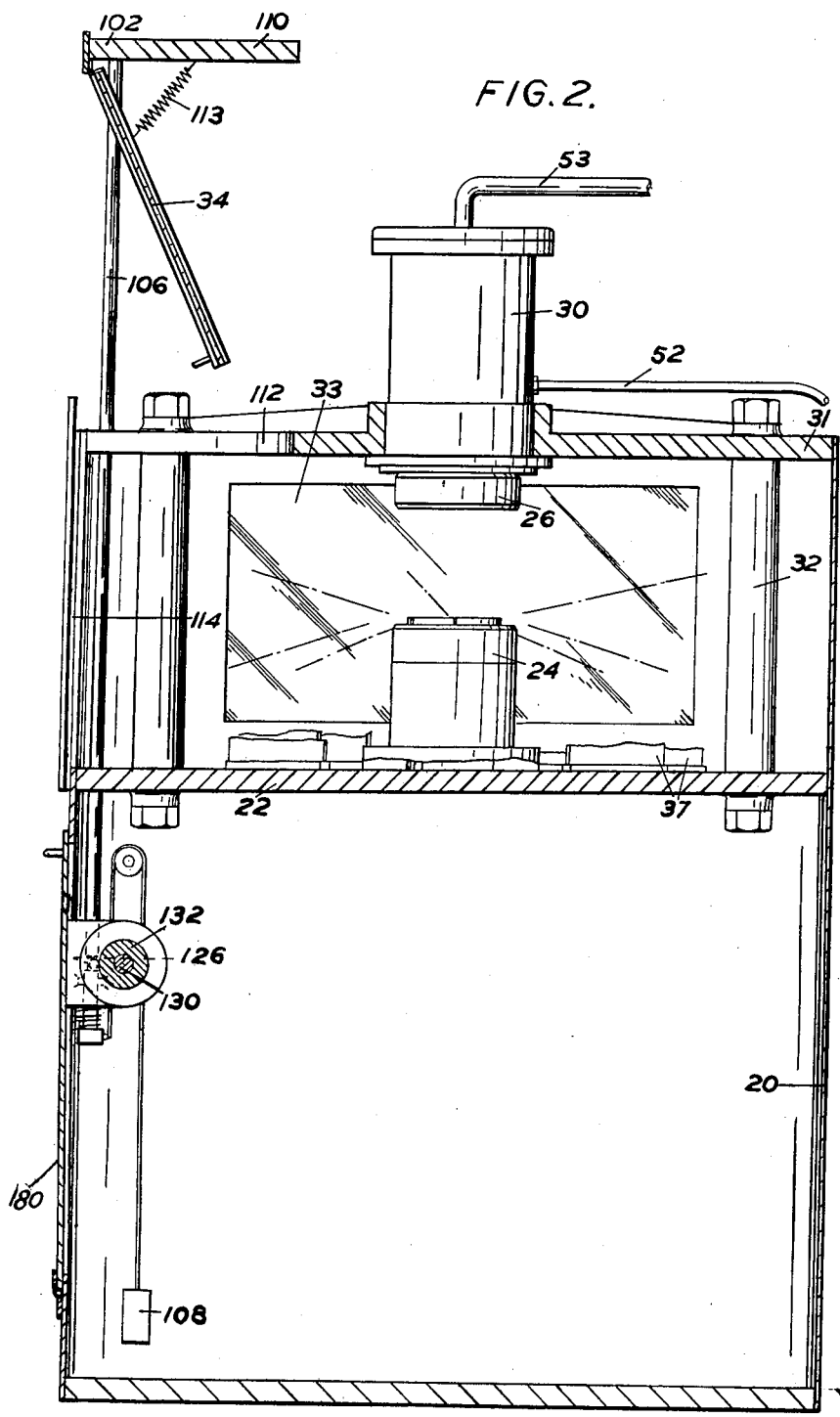

Inventor
WALTER LINES

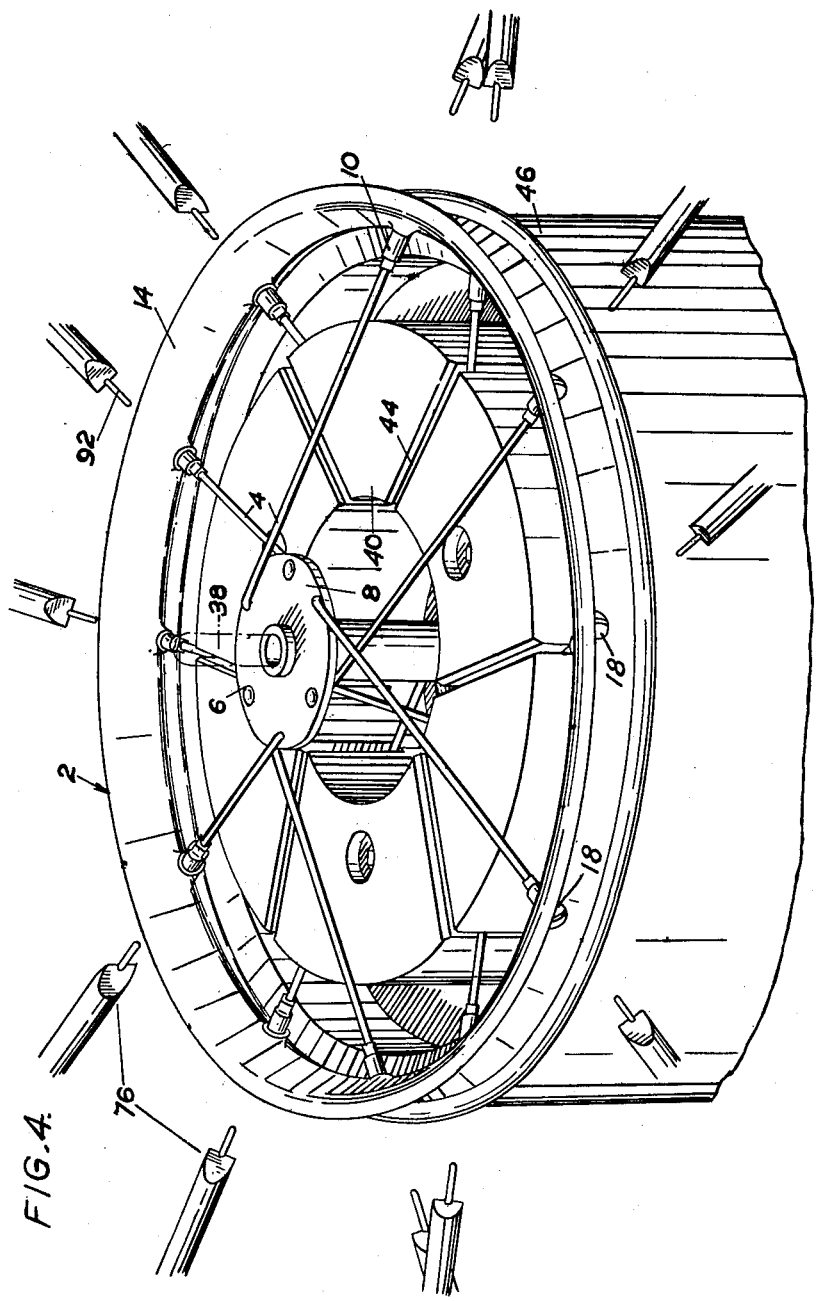

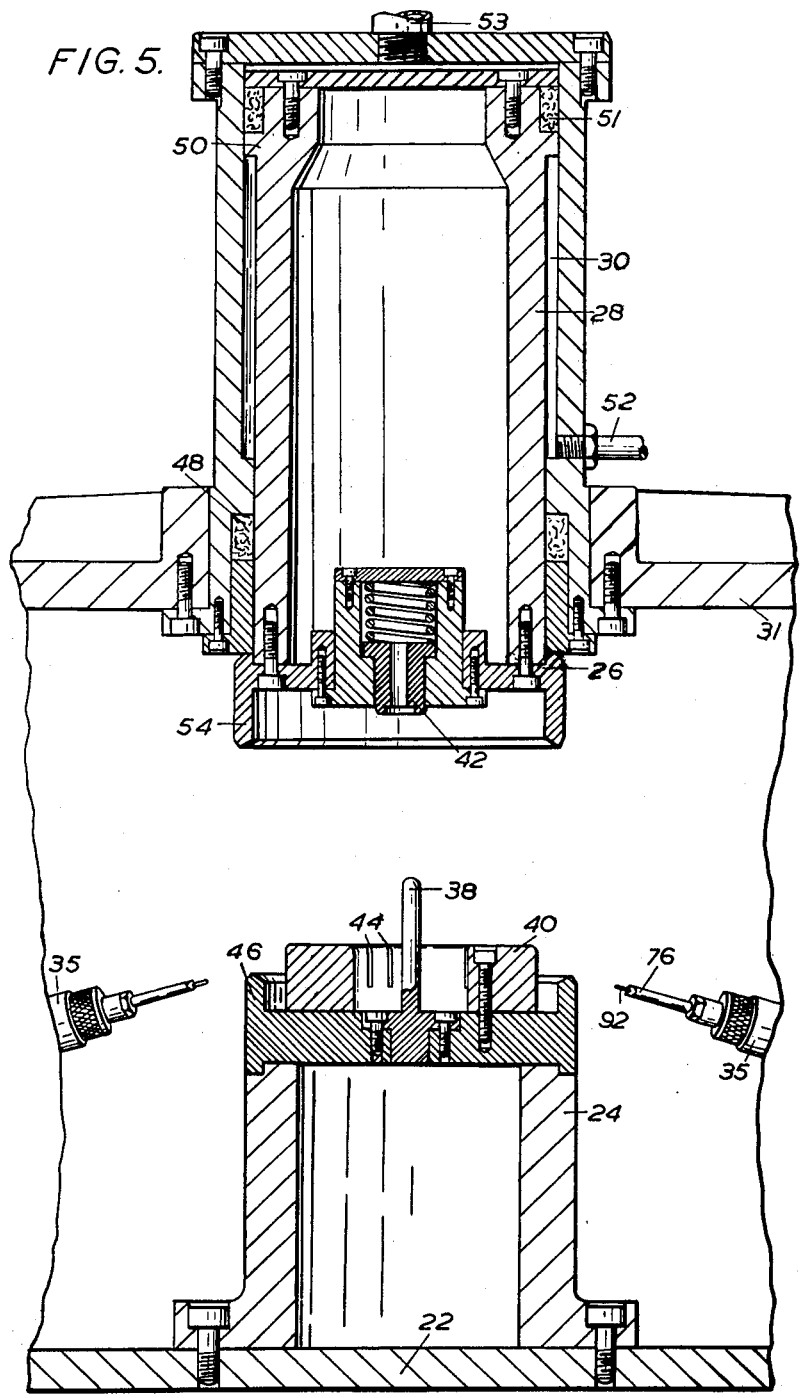

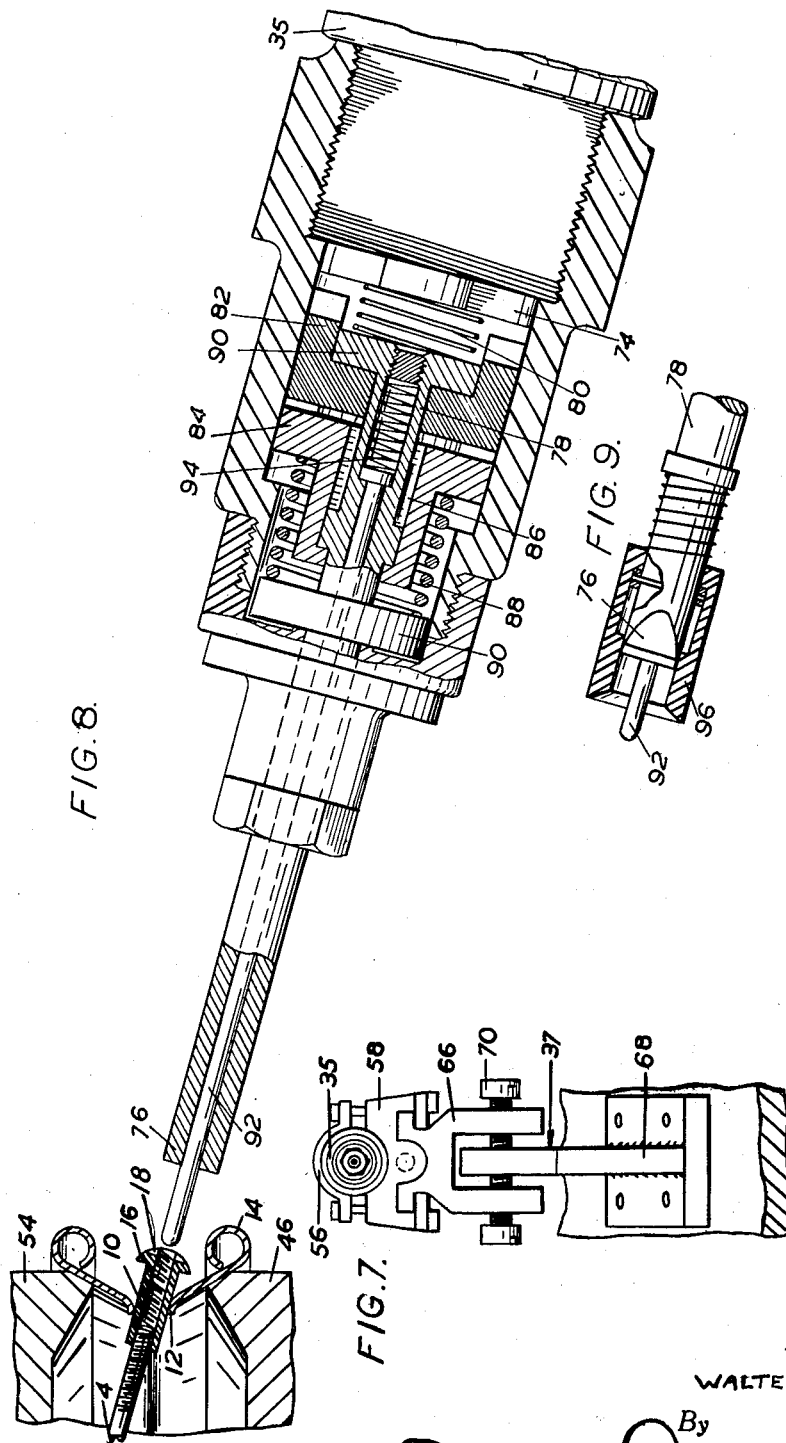

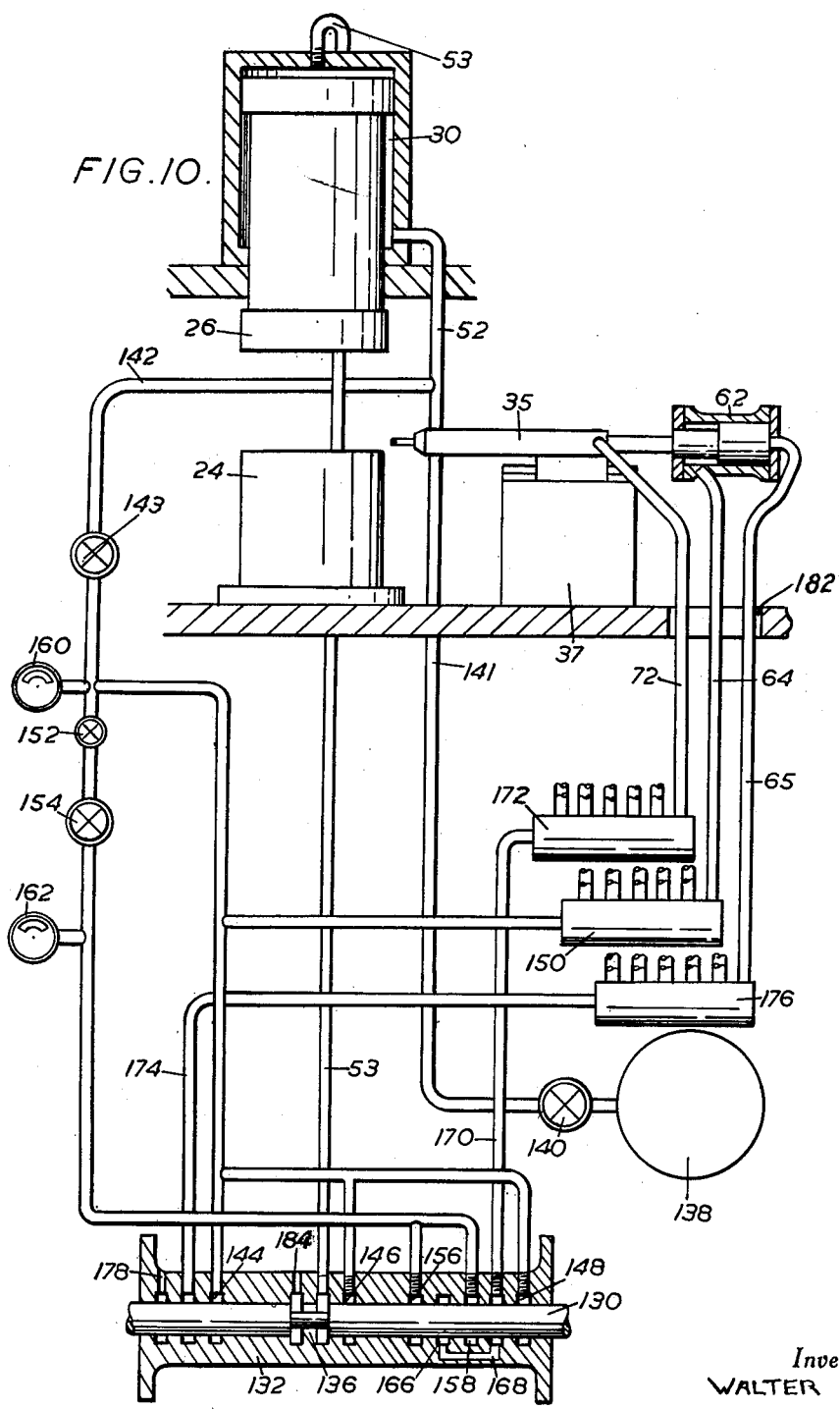

Feb. 28, 1956 W. LINES 2,736,368
METHOD AND APPARATUS FOR THE ASSEMBLY OF WIRE-SPOKE WHEELS
Filed Dec. 5, 1949 8 Sheets-Sheet 8
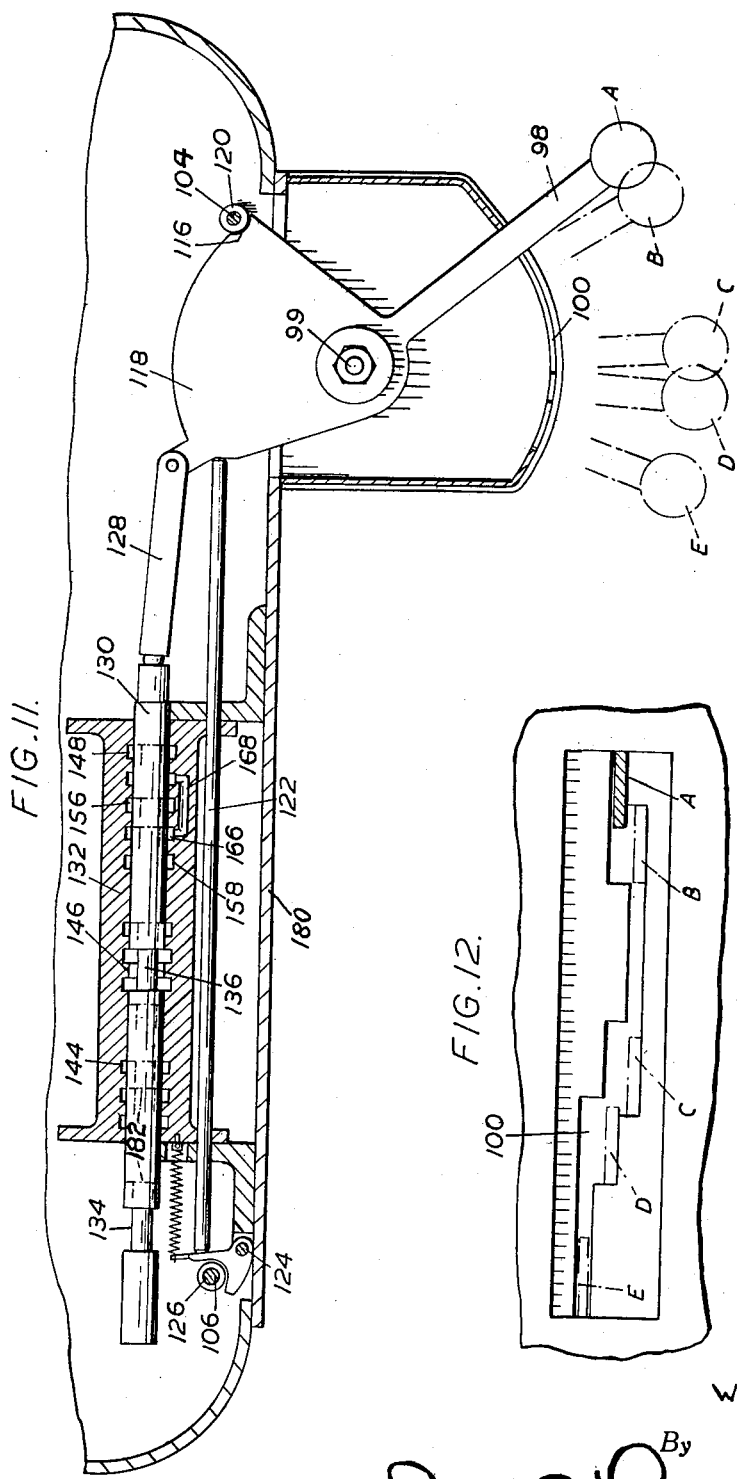
*Inventor*
WALTER LINES
By
*Attorney*

United States Patent Office 2,736,368
Patented Feb. 28, 1956

2,736,368

METHOD AND APPARATUS FOR THE ASSEMBLY OF WIRE-SPOKE WHEELS

Walter Lines, Merton, London, England, assignor to Lines Bros. Limited, London, England, a British company Application December 5, 1949, Serial No. 131,143

Claims priority, application Great Britain December 10, 1948

5 Claims. (Cl. 157—1.5)

This invention relates to the assembly of wire-spoke wheels. Hitherto such wheels have been assembled by placing the spokes in position between the hub and rim and tightening the spokes one by one with a portable tool while the hub and rim are gripped in a jig. When the wheel is released it is found that the rim is often distorted owing to irregular tightening of the spokes.

It is an object of the present invention in the assembly of a wire-spoke wheel to tighten the spokes simultaneously so that the rim remains a true circle.

It is another object first to take up the slack in spokes loosely placed in position and then to tighten the spokes simultaneously.

It is another object to proivde an apparatus for holding a wheel and tightening all the spokes simultaneously by a screwing action.

The invention will be more fully understood from the following description of the preferred embodiment, reference being made to the accompanying drawings, in which:

Figure 1 is a front elevation of the complete apparatus on a small scale;

Figure 2 is a vertical section.

Figure 4 is a perspective view on a large scale of a wheel lying in the lower half of the jig showing the positions of the screwdrivers;

Figure 5 is a central vertical section, on a larger scale than Figure 2, showing the two halves of the jig;

Figure 6 is a side elevation and Figure 7 an end elevation of a screwdriver and its mounting;

Figure 8 is a section showing the transmission of a screwdriver somewhat diagrammatically;

Figure 9 shows an alternative detail of Figure 8;

Figure 10 is a diagram of the compressed-air connections in the apparatus;

Figure 11 is a horizontal section through a control valve and operating handle; and Figure 12 is a detail view of a gate in which the operating handle moves.

Figure 3:
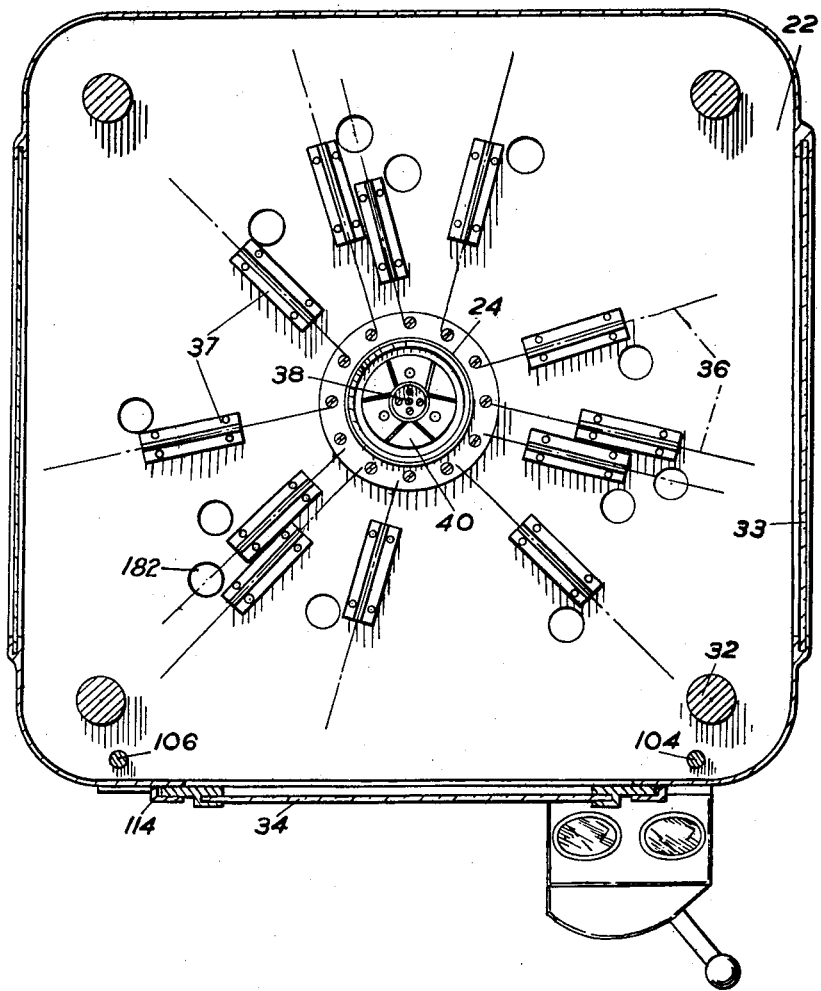
Figure 3 is a horizontal section of the apparatus on the lines II—II and III—III in Figure 1, both being on a larger scale, and the positions of the screwdrivers being indicated by centre lines only.

The apparatus is used to tighten the twelve spokes of a tangent-spoke perambulator wheel such as is shown at 2 in Figure 4. The spokes 4 have bent inner ends with enlarged heads 6 which engage holes in the hub 8. The outer ends of the spokes are held by nuts in the form of threaded nipples 10 shown on a larger scale in Figure 8. The shanks of these nipples pass through holes 12 punched in the rim 14 and their enlarged heads 16 engage the rim and are slotted at 18 to receive a screwdriver blade. The wheels are received at the apparatus with the nipples screwed only a few turns onto the spokes as shown in Figure 8. In the apparatus the nipples are all turned until the spokes are drawn up to the correct tension. As will be apparent from the description, similar apparatus in which other rotary tools such as box spanners are substituted for screwdriver blades may be used in the assembly of wire-spoke wheels in which the spokes are fitted with other forms of nuts, or are adapted to be themselves screwed into threaded holes or nuts at their inner ends.

The apparatus as shown in Figures 1 and 2 has a lower casing 20 which houses a control device in the form of a multiple valve and distribution piping for compressed air. The top of this casing forms a base plate 22 on which is mounted the lower half 24 of the jig. The upper half 26 of the jig is secured to a ram 28 working in a cylinder 30 carried by a plate 31 supported on four pillars 32. The jig is surrounded by a guard 33, the front 34 of which can be raised and swung to permit ready access and the insertion and removal of the wheels. Twelve screwdrivers 35 are supported on mountings 37 secured to the base plate 22. Their axes, indicated at 36, are aligned with the corresponding spokes 4 of a wheel inserted in the jig.

A wheel 2 is located in the jig by a spigot 38 and a guide ring 40. The hub 8 of the wheel fits over the spigot and is held firmly down by a spring-loaded hollow plunger 42 in the upper half of the jig. The ring 40 has six slots 44 cut in it to receive the spokes which run to the lower flange of the hub. Since these slots are inclined alternately to either side of a true radius a wheel can only be fully inserted in the jig in positions in which the spokes 4 and screwdrivers 35 come into alignment. The mouths of the slots 44 are slightly splayed so that a wheel will drop readily into the lower half of the jig. The rim 14 of the wheel then rests on a chamfered ring 46.

The wheel is gripped by lowering the upper half 26 of the jig. The ram 28 works through a gland 48 and has an enlarged head 50 with a sealing ring 51. A pipe 52 connects the lower part of the cylinder 30 directly to the supply of compressed air. Thus when the upper part of the cylinder is open to atmosphere the weight of the ram is rather more than balanced and so the ram is raised. It is lowered and considerable pressure set up in the jig by admitting compressed air to the upper part of the cylinder 30 through a pipe 53. The upper half of the jig includes the plunger 42 already described and a chamfered ring 54 which is the counterpart of the ring 46. When the ram is lowered the effect of the chamfering on these rings is to hold the rim 14 truly circular and concentric with the hub 8.

As shown in Figure 6, the casing of each screwdriver 35 is held by clips 56 to a slide 58 which is reciprocated on the mounting 57 by a piston 60 serving as means for moving the screwdriver in and out of operative position. This piston 60 works in a manner similar to the ram 28; that is to say, the front part of the surrounding cylinder 62 is connected by a pipe 64 directly to the supply of compressed air while the rear part is connected by a pipe 65 either to the supply, when the screwdriver is to be urged forward, or to atmosphere when it is to be withdrawn. The upper part 66 of the mounting on which the slide moves is clamped to the fixed lower part 68 by screws 70 which may be adjusted to bring the axis of the screwdriver into the correct line. The dotted outline 71 shows the inclination of the alternate screwdrivers which are on higher mountings.

The screwdriver itself is driven by a motor supplied with compressed air when required through a pipe 72. The motor turns a dog-clutch member 74, and as long as the blade 76 of the screwdriver is in engagement with a nipple its shaft 78 is pressed back against a light spring 80 to bring a second clutch member 82 into engagement with the member 74. The member 82 is loose on the shaft 78 and its front face clutches with a third member 84 which is splined to the shaft at 86 and is urged into contact with the member 82 by a strong spring 88. The two members 82 and 84 and the spring 88 are confined between collars 90 on the shaft 78. The engaging dogs on the members 82 and 84 are wedge-shaped so that when a nipple has been screwed tight the member 82 slips on the member 84 and so the head of the nipple is not torn by excessive torque.

The blade 76 of the screwdriver is guided into the slot 18 of a nipple by a pin 92 which projects beyond the end of the blade under the action of a spring 94. Alternatively, or in addition, the blade may carry a sliding sleeve 96 as shown in Figure 9.

The apparatus is controlled by a handle 98 pivoted at 99 and working in a gate 100. The sequence of operation is as follows:

In the position shown at A the ram is raised and the front 34 of the guard is free to open. The cycle of operation begins in this position with the insertion of a wheel in the lower half of the jig. The front of the guard is then closed and the handle moved to the position B to lock the guard and lower the ram. In the position C air is supplied to the screwdriver motors at low pressure to turn them gently. In the position D air is supplied to drive the pistons 60 forward so that the screwdrivers engage the nipples and turn them until slack is taken up. Since the motors are only supplied with air at low pressure they then stop. In the position E air at high pressure is supplied to the screwdriver motors so that the nipples are turned further until the torque causes the clutch members 82 and 84 to slip. The spokes are then under substantially equal tension. The handle is returned through the gate to the position A to withdraw the screwdrivers, raise the ram and unlock the guard so that the wheel can be removed and a further one inserted.

The front 34 of the guard is hinged along its top edge to a vertically sliding frame 102. This frame includes two rods 104 and 106 and is balanced by counterweights 108. When the frame is raised a rearward flange 110 on it uncovers a cutaway sector 112 in the plate 31 and the front 34 of the guard is freed to swing rearwards under the action of a spring 113. When the front is to be closed it is pulled forwards and then downwards with its side edges entering guiding grooves 114. The rod 104 passes a hollow 116 in a quadrant 118 which is rigid with the handle 98. So long as the frame 102 is raised, the handle cannot be moved from position A. When the frame is fully lowered, a groove 120 in the rod 104 comes opposite the quadrant 118 and allows it to swing. The rod 104 is then locked in its lowered position. At the same time movement of the quadrant permits a push rod 122 to release a catch 124 which enters a groove 126 in the rod 106 which is thus also locked.

The quadrant 118 is connected through a pivoted link 128 to a valve rod 130 working in a valve casing 132. There are two grooves 134 and 136 in the rod which serve to connect ports in the casing. Compressed air from a reservoir 138 is supplied through a main valve 140 to a pipe 141, off which branches the pipe 52 leading to the lower part of the cylinder 30. A second branch 142 leads to an adjustable reducing valve 143, from which run connections to ports 144, 146 and 148 in the valve casing 132, to a manifold 150 and through a fixed reducing orifice 152 to a second adjustable reducing valve 154. The manifold 150 supplies the pipes 64 leading to the front parts of the cylinders 62. Air passing through the valves 152 and 154 reaches ports 156 and 158 in the valve casing 132. The pressure of air after passing through the valves 143 and 154 is indicated on gauges 160 and 162 at the front of the apparatus, and the handwheels for the valves project through the casing 20 at 164.

The successive positions of the grooves 134 and 136 as the handle 98 is moved are indicated at 182. In the position A air in the upper part of the cylinder 30 escapes through the pipe 53 and the groove 136 to a vent 184 and the ram 28 is raised by air entering the cylinder through the pipe 52.

In the position B air from the port 146 passes into the pipe 53 and the ram is lowered.

In the position C air at low pressure from the reducing valve 154 passes from the port 156 to a port 166 and through a transfer passage 168 to a pipe 170 leading to a manifold 172 which supplies the motors of the screwdrivers 35 through the pipes 72. The motors thus turn with the clutch members 74 and 82 disengaged.

In the position D air passes from the port 144 into a pipe 174 leading to a manifold 176 which supplies the rear parts of the cylinders 62 through the pipes 65. The screwdrivers move into engagement with the nipples and the blades turn until the slack is taken up, low pressure air being now supplied to the motors from the port 158 through the transfer passage 168.

In the position E the motors receive air at high pressure from the port 148 and the blades turn again until the clutch members 82 and 84 slip. The handle is then returned to the position A and when it passes through the position C air in the rear parts of the cylinders 62 is released through the pipe 174 to a vent 178 so that the screwdrivers are withdrawn.

The valve casing 132 is mounted on the rear face of a panel 180 which is hinged along its lower edge. The pipes 64, 65 and 72 are flexible and pass to each screwdriver through openings 182. The pipe 142 is also flexible and thus for inspection purposes the panel 180 may be swung forwards through about 30° without disconnecting any pipe.

It will be seen that the operating means whereby the screwdrivers are simultaneouly brought into action comprises both the multiple valve and compressed air distribution piping and also the pistons 60 and cylinders 62 and the compressed air motors with their clutch members 74, 82 and 84. The tightening of the spokes is brought about by the cooperation of the operating means with the jig and with the screwdrivers themselves.

While the operating means in the preferred embodiment is pneumatic, it will be apparent that other forms of power may be used. Thus the operating means may be electric and comprise electric motors for the rotary tools, solenoids for moving the tools in and out of engagement and a system of ganged switches controlling the distribution of current.

I claim:

1. A method for assembling a wire-spoke wheel, comprising the steps of loosely placing the spokes in position between the hub and rim of said wheel, holding said hub and rim firmly in relative position, applying a plurality of rotatable tools to the outer ends of said spokes, imparting to all said tools simultaneously a small torque to take up slack in said spokes and maintaining said small torque until said tools have all ceased to turn, and thereafter imparting to all said tools simultaneously a large torque to tighten said spokes and maintaining said large torque until said tools have again all ceased to turn.

2. Apparatus for tightening the spokes of a wire spoke wheel comprising, in combination, a jig adapted to grip the hub and rim of a wheel, a plurality of rotatable tightening tools, one of said tools corresponding to each spoke of said wheel, means for simultaneously applying said tools to the outer ends of said spokes, individual motor means for driving each of said tools, means for selectively applying a small torque and subsequently a large torque simultaneously to each of said motor means, said motor means stalling when said spokes are tightened to an intermediate position by said small torque, first clutch means associated with each of said tools for selectively disengaging said motor means and said tools when said spokes are tightened to a final position by the large torque, means to maintain each of said tools disengaged from said motor means when no pressure is applied against said tools and second clutch means to engage each of said tools with its motor when pressure is exerted against said tools.

3. The combination as claimed in claim 2 in which said means for selectively applying torque comprises a multiple valve distributing compressed air to said motors at either of two pressures.

4. The combination recited in claim 2 wherein said jig comprises a hub engaging element, a chamfered ring spaced from said hub engaging element for receiving the rim of a spoke wheel and a slotted guide ring disposed between said hub engaging element and said chamfered ring, said guide adapted to receive the spokes of a wheel.

5. The combination as claimed in claim 4, in which said tools comprise air motors and said last-named means comprises a multiple valve distributing compressed air to said motors at either of two pressures.

References Cited in the file of this patent

UNITED STATES PATENTS

| | | |
|---|---|---|
| 569,888 | Sanderson | Oct. 20, 1896 |
| 1,791,781 | Wilson | Feb. 10, 1931 |
| 1,980,129 | Eksergian et al. | Nov. 6, 1934 |
| 2,422,593 | Smith | June 17, 1947 |
| 2,533,113 | Henry | Dec. 5, 1950 |
| 2,536,317 | Shakesby | Jan. 2, 1951 |
| 2,607,402 | Meydrech | Aug. 19, 1952 |

FOREIGN PATENTS

| | | |
|---|---|---|
| 408,900 | Great Britain | Apr. 19, 1934 |